United States Patent

Segawa

[15] 3,670,856
[45] June 20, 1972

[54] INTER HOUSING MULTI-SPEED TRANSMISSION HUB PROVIDED WITH A COASTER BRAKE

[72] Inventor: Takashi Segawa, c/o Shimano Industrial Co. Ltd. 77, 3-cho, Oimatsu-cho, Sakai City, Japan

[22] Filed: Sept. 4, 1970

[21] Appl. No.: 69,693

[30] Foreign Application Priority Data

March 25, 1970 Japan..................................45/25091

[52] U.S. Cl. .............................................192/6 A, 74/750 B
[51] Int. Cl. .......................................F16d 41/30, F16h 5/10
[58] Field of Search................................192/6 A; 74/750 B

[56] References Cited

UNITED STATES PATENTS

| | | | |
|---|---|---|---|
| 2,854,108 | 9/1958 | Douglas | 192/6 A |
| 2,892,521 | 6/1959 | Spencer | 192/6 A |
| 3,257,868 | 6/1966 | Preece | 192/6 A X |

*Primary Examiner*—Allan D. Herrmann
*Attorney*—McGlew and Toren

[57] ABSTRACT

In the hub shell of a bicycle or the like a gear shifting mechanism mounted to be axially moveable is such that when the pedal is reversely rotated it is transferred in the axial direction and expands the brake shoes to forcibly press the same against the inner walls of the hub shell, thereby braking the rotation of the bicycle wheel. Thus by transferring the gear shifting mechanism for the braking purpose, it is possible at any time when necessary to secure the most reliable braking effect, in whatever speed changing condition the gear shifting mechanism may be or even if any parts thereof are damaged and even if the wire rope thereof has been extended in protracted use.

7 Claims, 8 Drawing Figures

INTER HOUSING MULTI-SPEED TRANSMISSION HUB PROVIDED WITH A COASTER BRAKE

The present invention relates to an inner housing multi-speed transmission hub provided with a coaster brake mainly useable for bicycles or any similar velocepedes, and more in particular it relates to such a multi-speed transmission hub that a speed change gear is housed in and a coaster brake is adapted to be controlled by rotating the pedal in the direction opposed to the normal rotation.

Generally speaking, a conventional inner housing multi-speed transmission hub provided with this type of a coaster brake is rotatably mounted with respect to a fixed shaft held on a bicycle frame member, and comprizes a driving means driven by a driving chain, a gear shifting means for transmitting three selectable speeds, low, intermediate and high to the hub shell, a control means for controllably relaying the driving power of said driving means to the gear shifting mechanism, a brake frame screwed to a threaded cylindrical structure so as to move axially along with the reverse rotation of the pedal, and a brake portion to be pressed against the inner surface of the hub shell by the movement of the brake frame.

According to the above-mentioned mechanism, a driving power preferrably selected by rotating the pedal in the normal direction to rotate the driving means and suitably operating the control means is transmitted as far as the hub shell through a driving power transmitting mechanism so that the hub shell is driven to rotate at a desirably changed speed.

On the contrary, however, said driving power is transmitted through said mechanism as far as the brake by rotating the pedal in the reverse direction whereby the brake is moved to have the brake portion thereof pressed against the inner surface of the hub shell, consequently bringing to a halt the driving movement of the hub shell or the rotation of a wheel.

In a general, the driving portion is adapted to operate the brake in the manner that when it rotates in the reverse direction it can transmit the driving power to the brake frame through the same mechanism as it does when rotating in the normal direction. However, in case the brake frame is so arranged in the above-mentioned manner as to move through the rotation of the mechanical components constituting a speed change gear system, the brake frame is moved subject to the changed condition of the speed since the driving power is transmitted to the brake frame in the state where said mechanical components are always rotatable at so freely changed a speed as a cycler prefers so that the braking force is too much varied on each occasion to operate the brake frame in a normal condition, consequently giving rise to a great jeopardy.

As has been mentioned above, the difficulty with the conventional multi-speed transmission hub which is arranged so as to shift the speed of a bicycle by the operation of said control means is that when it is necessary to shift the speed rate, said control means often fails to be engaged with the speed change gear portion and results in running idle.

Thus in such a case, the brake frame will never move how many times and how painstakingly a cycler may work the pedal backward so as to rotate the driving means in the reverse direction. Furthermore, the control means is operated from the outside by use of a wire rope which is doomed to be extended while it is used protractedly. Thus even if said control means is operated in a proper manner, the extended wire rope will not work to engage this with the speed change gear portion, or at best it will barely work to engage a certain portion of the control means with a certain portion of the speed change gear.

Therefore, even if it happens that said portions are engaged with each other, they will be easily disengaged from each other and the driving power of the driving means cannot be transmitted to the brake frame. As long as the brake frame is not moved, it cannot take braking effect at all, and the result is clearly evident that a dangerous situation is brought about. Therefore my previous invention was made especially to obviate this situation, and according to which in whatever speed condition the driving means may be being rotated in the normal direction, it can be easily shifted to rotate reversely at low speed once it has been operated to rotate in the reverse direction, with the result that the brake frame is revolved at low speed. However, even in this case, the brake frame is moved only by the rotation of the gear shifting mechanism. Thus there cannot be always secured the safe and reliable braking effect partly because some portions of said gear shifting mechanism are apt to get out of order and partly because the brake is operable only in case it rotates in the reverse direction, and consequently damage some portions of the low speed transmission mechanism.

What is more, in order to embody said previous invention it was necessary to provide a special gear shifting mechanism which can shift speed into into a lower rate when the brake rotates in the reverse direction so that the mechanical structure of the hub is made much more complicated.

The present invention aims at eliminating all these defects that always go with the conventional type of a brake so arranged as is able to take braking effect by the operation of the brake frame which is rotatable only in case the driving power is transmitted to the gear shifting mechanism. In brief, the mission of the present invention is to succeed in supplying such a gear shifting mechanism that is not rotatable on the axis but moveable in the axial direction.

Accordingly, it is one of the main objects of the invention to provide a bicycle hub mechanism in which a coaster brake and a multi-speed transmission hub are both housed in the manner that said coaster brake can work at all times with the equal driving ratio irrespective of the speed rate to be changed by the gear shifting mechanism.

It is another object of the invention to provide such a hub mechanism that can work in a normal state as ever even if some portions thereof for example as an engageable pawl member or the like are seriously damaged and cannot function any more as a hub.

It is further another object of the invention to provide such a hub mechanism that can still take braking effect as ever as before even if the wire rope of the gear shifting mechanism has been extended gradually according as it is used protractedly and consequently the shifting operation cannot be made exactly.

While the detailed description of the invention is as set forth hereinafter, the novel features of the invention are as defined in the appended claims.

Referring to the accompanying drawings.

Figure 5A:
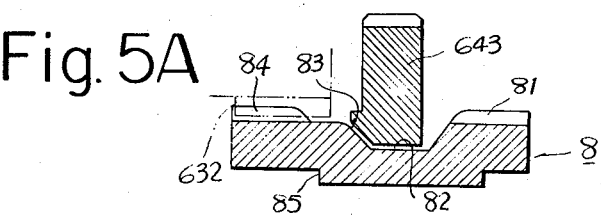
Figure 5B:
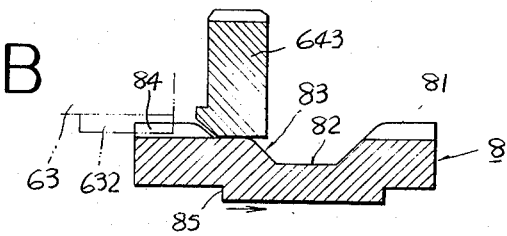
Figure 5C:
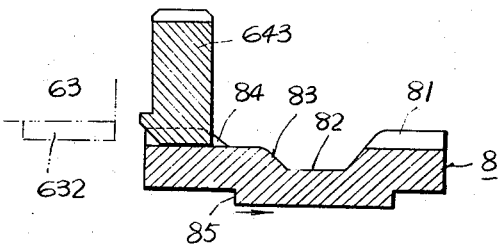
Figure 6:
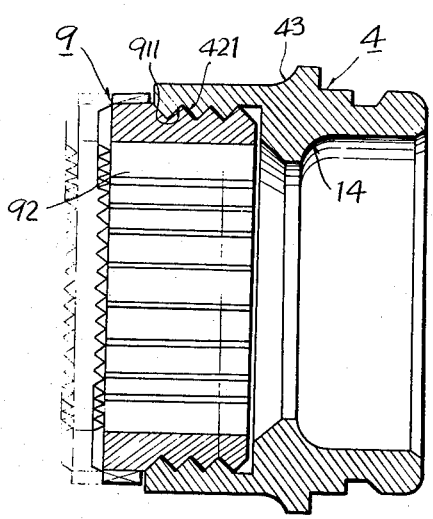

FIGS. 5(A), 5(B) and 5(C) are illustrative respectively of each operational state of the brake means to be employed in this invention wherein especially FIG. 5(A) shows the operational state of a high speed transmission hub portion, FIG. 5(B) shows the operational state of an intermediate speed transmission hub portion and FIG. 5(C) shows that of a low speed transmission hub portion, respectively;

FIG. 6 is a vertical cross section showing the principal elements of another embodiment of the cam to be provided between the driving means and the actuating means.

The following is a detailed explanation of the multi-speed transmission hub mechanism of the present invention with reference to the accompanying drawings.

In the drawings is shown a hub mechanism with a gear shifting mechanism capable of transmitting three selectable speeds, low or first, intermediate or second and high or third. However, this is merely a single example and according to the invention it is also possible to provide on the hub mechanism with such a gear shifting mechanism that can transmit selectively more number of speeds than three speeds. Thus it is to be noted that the construction of the hub mechanism is not to be limited to the modes shown in the accompanying drawings.

What are shown in the drawings comprise the following means. Namely, a fixed shaft 1 is held by means of frame members 2 and 3. A driving means 4 is rotatably mounted on said fixed shaft 1 in a properly spaced relation therewith. A hub shell 5 is mounted rotatably on this driving means 4. A gear shifting mechanism 6 housed in the hub shell 5 is to freely change the driving power of the driving means 4 into a desired speed and transmit the same to the hub shell 5 so as to rotatably move the latter. A brake means 7 disposed on one side of said gear shifting mechanism 6 (on the left hand side with respect to the accompanying drawings) works to halt the rotation of the hub shell 5 when said gear shifting mechanism 6 has been moved. A control means 8 is interposed between the driving means 4 and the gear shifting mechanism 6 and controllably relays the driving power of the driving means 4 as far as the gear shifting mechanism 6. An actuating means 9 is mounted to be connected to the driving means 4 and moves the gear shifting mechanism 6 in the axial direction when the driving means 4 rotates reversely.

Setting forth in greater detail the construction of the hub mechanism embodying the present invention, said fixed shaft 1 is in its almost intermediate portion provided with a sun gear 10 engageable with planetary gears of the gear shifting mechanism which will be referred to hereinafter, and in each peripheral wall of both ends of said fixed shaft 1 are formed threaded channels 11 and 11'. To said threaded channel 11 is screwed a ball holder 13 having a ball holding area 12.

Between a ball holding area 14 formed in the inner surface of said driving means 4 and the ball holding area 12 of said ball holder 13 there is interposed a ball 15 through means of which the driving means 4 is rotatably mounted on the fixed shaft 1 in a properly spaced relation therewith. To the right hand side of the driving means 4 is secured a sprocket wheel 41 engaged with a driving chain (not shown) so as to forcibly drive the driving means 4 through pedal movement, while at the left is provided a cam 42 which when the driving means 4 rotates in the normal direction, is engaged with said actuating means 9 thereby to rotate the same together with the driving means 4.

Said cam 42 comprises a surface 42a (which will be referred to hereinafter) for transmitting the driving power to the actuating means 9 and an inclined surface 42b which does not transmit said power to the actuating means 9.

In the outer peripheral surface of said driving means 4 is formed a ball holding area 43 in the manner that it is rotatable through a ball 16 relatively to a mounting cylinder 51 secured to the right of the hub shell 5. Furthermore, to the left hand side of said hub shell 5 is also secured a mounting cylinder 52 which is rotatably held through a ball 17 between said hub shell 5 and a ball holding area formed in the brake cone of the brake means 7 as will be subsequently described.

The actuating means 9 is arranged to engage with the cam 42 of the driving means 4 so as to rotate together therewith and is provided with a cam 91 having a driving power receiving surface 91a engageable with said driving power transmitting surface 42a of the cam 42, an inclined surface 91b contactable with the inclined surface 42b and inside teeth 92 engaged with teeth 81 of the control means which will be referred to later.

When the driving means 4 rotates in the normal direction, the actuating means 9 rotates together therewith, but when the former rotates reversely, the latter is moved to the left with respect to the driving means 4 which is disposed subject to the sliding movement between the inclined surface 42b of the cam 42 and the inclined surface 91b of the cam 91.

The control means 8 for controllably relaying the driving power to the gear shifting mechanism 6 is rotatably and moveably mounted on the fixed shaft 1 and in the intermediate portion thereof there are formed an annular channel 82 and an annular protrusion 83 having a tapered guide surface. At the right of, and in the periphery of said annular channel 82 there are provided teeth 81 engageable with said inside teeth 92 of the actuating means 9. Likewise at the left of, and in the periphery of said annular protrusion 83 there are provided teeth 84 engageable with the inside teeth of a gear frame for a gear shifting mechanism which will be subsequently described.

Said control means 8 can be axially moved by operating a push rod 20 having a gear shifting key 19 inserted in the hollow portion 18 of the fixed shaft 1. Furthermore, said control means 8 is rotated when it is engaged with the inside teeth 92 of the actuating means 9 so that the rotation thereof is transmitted to a predetermined position of the gear shifting mechanism 6.

Incidentally, said gear shifting key 19 has its portion 22 protruded outwardly of the fixed shaft 1 from a slot 21 communicated with the hollow portion 18 of the fixed shaft 1 in the manner that said protruded portion 22 is engageable with notches 85 of the control means 8.

In order to maintain this engagement a spring 23 is interposed between the control means 8 and the ball holder 13 so as to normally press the control means 8 against the protruded portion 22 of the gear shifting key 19, whereby the control means 8 is axially moveable forward and backward always in a proper manner by operating said push rod 20.

Now referring more in detail to that type of a gear shifting mechanism 6 which is housed in the hub shell 5 and arranged to move in the axial direction, it is constructed in the following manner; that is, a plurality of planetary gears supported by means of a shaft 631 are arranged so as to engage with said sun gear 10 mounted on the fixed shaft 1 and the internal gear 632 is disposed at the right of said shaft 631 in a manner to engage with the teeth 84 disposed at the left of the control means 8.

At the left of these planetary gears 62 a plurality of pawls 633 for selectively transmitting one of intermediate and low speeds are supported by means of said gear frame 63 so as to be engageable with said ratchet means 54. Further, at the right of said gear frame 63 there is mounted a brake portion 635 having the faces 634 tapered toward the left thereof which correspond to each brake shoes of the brake 7 as will be subsequently described. From the outer periphery of the right end of said gear frame 63 to the left end of said actuating means 8 there is mounted a ring gear 64.

In the left inner surface of this ring gear 64 there is disposed an internal gear 641 engageable with said planetary gears. Furthermore, said ring gear 64 is provided with an engaging element 642 in such a manner as to contact with the right end of said gear frame 63. Said ring gear 64 has a singularity or plurality of pawls 643 for transmitting high speed supported by one or more shafts 645, the foremost end of said pawls are engageable with a ratchet means 53 mounted in said mounting cylinder 51 by means of a spring 644 while the opposed ends of said pawls 643 are mounted in the manner of corresponding to either the annular channel 82 or the annular protrusion 83 formed in the control means 8.

According to the gear shifting mechanism of the present invention, the driving power of the driving means 4 is transmissible from the actuating means 9 to this mechanism 6 through the control means 8 when the driving means 4 rotates in the normal direction. However, when the driving means 4 rotates reversely, the ring gear 64 adjacent said actuating means 9 is axially pushed along with the axial movement of the latter means 9 so that the engaging element 642 is brought into contact with the extreme face of the gear frame 63 and moves this gear frame 63. In other words, when the driving means 4 rotates reversely, the gear shifting mechanism 6 is not rotated but moved in the axial direction whereby said brake portion 635 having a face tapered in the left extreme of the gear frame 63 expands outwardly the brake shoes of the brake means thereby to take braking effect as will be subsequently described.

In order to obviate this gear shifting mechanism from axially moving unexpectedly when it rotates in the normal direction, a spring 24 more resilient than the spring 23 is held between the left end of the gear frame 63 and a brake cone subsequently described thereby to press the control means 8 toward the left direction.

Lastly accounting for the brake 7, it is provided with a tapered face 711 corresponding to the tapered face 634 of the brake portion 635 disposed at the left of said gear frame 63 and comprises both brake shoes 71 inclined to be radially pressed by means of a plate spring 72 and brake cone 73 for supporting said brake shoes 71.

According as the gear shifting mechanism 6 moves, the tapered face 634 of the brake portion 635 formed in the gear frame 63 is brought into contact with said tapered face 711 of the brake shoes 71 so that said brake shoes 71 are expanded outwardly in the direction of their radius against the plate spring 72, and the outer peripheral surface thereof is slidably contacted with the inner peripheral surface of the mounting cylinder 52 so as to operate the hub shell 5 thereby to secure effective braking operation.

The brake cone 73 is secured to a bicycle frame member 3 through a brake arm 74. Thus when the brake shoes 71 work they abut against this secured brake cone 73 and slidably contact with the mounting cylinder 52 while being prevented from rotating. In the drawings, reference numeral 25 designates a thread screw for screwing the brake cone 73 and the brake arm 74 into the fixed shaft 1.

Sleeved closely to the outer periphery of the actuating means 9 is a cylindrical structure 26 for normally operating this means 9. A spring 27 having less resiliency than the spring 23 is to press the gear shifting key 19 toward the control means 8.

While the construction of the multi-speed transmission hub embodying the present invention is as explained in the preceding, the operation of the hub will be manifest from the following disclosure.

When the driving means 4 rotates in the normal direction, the driving power is transmitted to the actuating means 9 through the engagement of the transmitting surface 42a of the cam 42 with the transmitted surface 91a of the cam 91, and further transmitted to the control means 8 when this means is engaged with the inside teeth 92 of said actuating means 9, until at last to be transmitted as far as the gear shifting mechanism 6 after having been changed into a desired speed rate through said control means 8 whereby one of the three selectable speeds, low, intermediate and high, is selectively transmitted to the hub shell 5 to rotate the wheels at a desirably changed speed rate.

Figure 1:
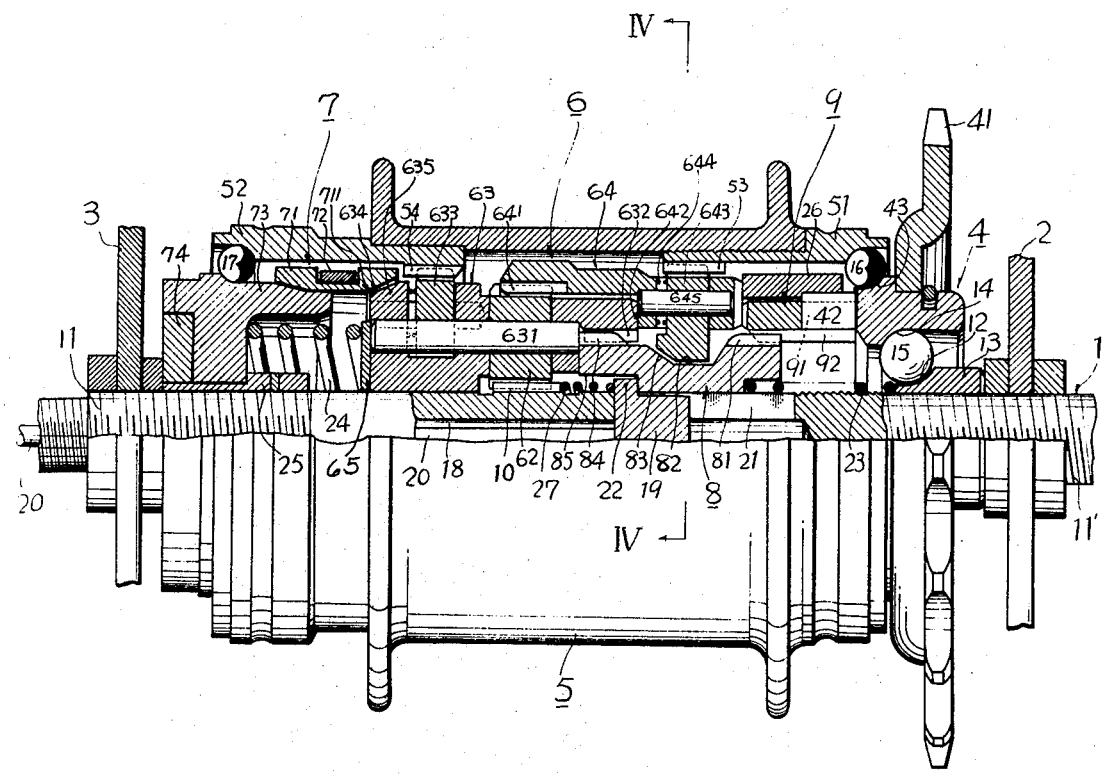
FIG. 1 is a front view partially showing an inner housing multi-speed transmission hub provided with the coaster brake of this invention.

In the drawings FIG. 1 shows the hub which is in a position of transmitting the increased driving power of the driving means 4 to the hub shell 5. In this case, the control means 8 is disposed in the left-most position or the position of FIG. 5(A) in which the teeth 84 of the control means 8 are engaged with the inside teeth 632 of the gear frame 63, and the driving power of said control means 8 is arranged to be transmitted from the gear frame 63 to the gear shifting mechanism 6.

In case the driving means 4 is driven to rotate in the normal direction through a sprocket wheel 41, the hub shell 5 is rotated at an increased speed rate through the driving power transmission course composed of the driving means 4, the actuating means 9, the control means 8, the gear frame 63, planetary gears 62, the ring gear 64, pawls 643 for transmitting high speed, ratchet means 53, and the mounting cylinder 51.

In this case, the pawls 633 for transmitting intermediate and low speeds are in engagement with the ratchet means 54. However, these pawls will merely slide over said ratchet means and stay motionless because the hub shell 5 rotates faster than said pawls.

Further in case it is necessary to shift said high speed into intermediate speed, the push rod 20 is forced into the right so as to move the control means 8 to the right, and said opposed ends of the high speed transmitting pawls 643 disposed in the annular channel 82 and engaged with the ratchet means 53 are raised along the guide surface thereof up to said annular protrusion 83 so as to separate the foremost end of the pawls from the ratchet means 53, as is definitely illustrated in FIG. 5(B).

By this arrangement it is made possible that the driving power of the driving means 4 firstly transmitted to the actuating means 9 is further transmitted as far as the hub shell 5 to revolve the same at intermediate speed through the transmitting course including the control means 8, the gear frame 63, the pawls 633 for transmitting intermediate and low speeds, the ratchet means 53 and the mounting cylinder 52 that are all directly connected.

As best shown in FIG. 5(C), when the control means 8 is moved to its right-most end by moving the push rod 20 to the right thereby to disengage the high speed transmitting pawls 643 from the ratchet means 53 and release the engaged relation between the left-side teeth 84 of the control means 8 and the inside teeth 633 of the gear frame 63, the driving power relayed from the actuating means 9 to the control means 8 is not transmitted directly to the gear frame 63 but transmitted thereto through said pawls 643, the ring gears 64 and the planetary gears 62.

Consequently, the hub shell 5 is driven at low speed through the above-mentioned intermediate speed transmitting mechanism.

Figure 2:
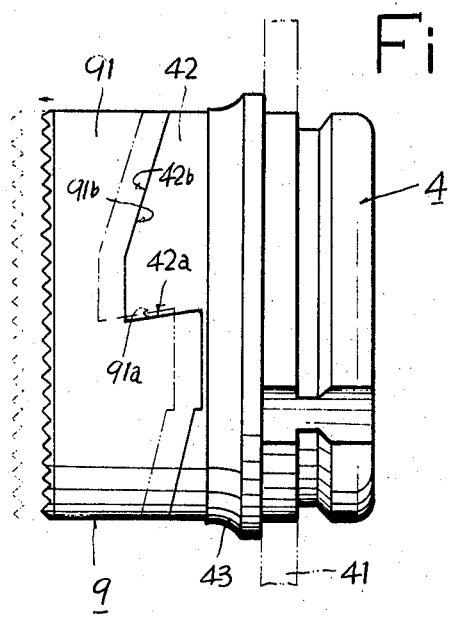
FIG. 2 is a front view showing the principal elements thereof.
Figure 3:
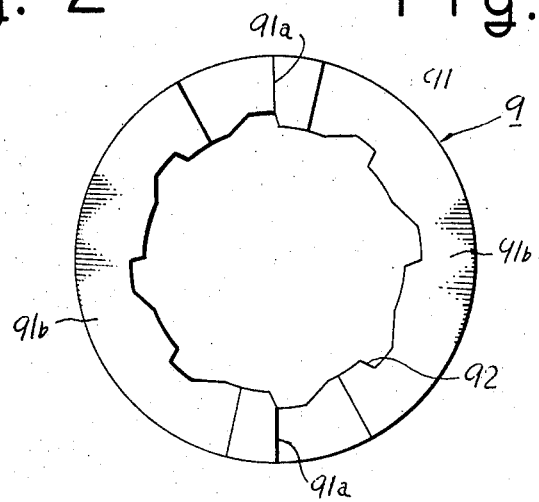
FIG. 3 is a side elevation view of the actuating means to be used in this invention.
Figure 4:
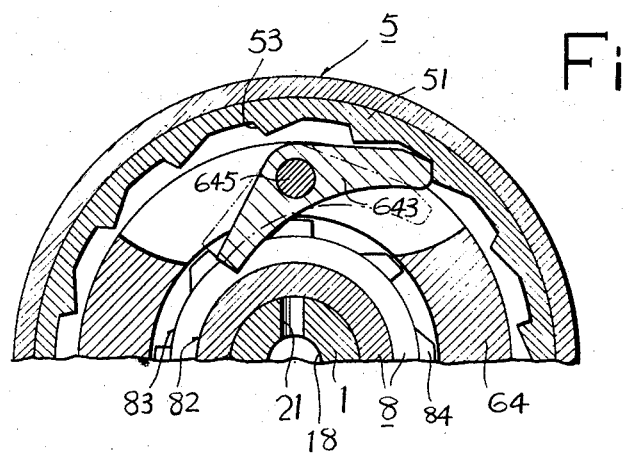
FIG. 4 is a cross-sectional view showing some of the principal elements taken on the line IV—IV of FIG. 1.

When the driving means 4 rotates in the normal direction, the actuating means 9 is in engaged relation therewith. But when it is rotated reversely, the inclined face 91b of the cam 91 of the actuating means 9 slides merely on the inclined face 42b of the cam 42 of the driving means 4. Thus, the rotation of the driving means 4 is not transmitted to the actuating means 9, and as is clearly shown in phantom in FIG. 2, the actuating means will be axially moved to the left due to the sliding movement of the cam 91. By said movement of the actuating means 9, both the ring gear 64 and the gear frame 63 involving a whole unit of the gear shifting mechanism 6 are moved along their respective axis in the same direction against the spring 24 regardless of the above-mentioned speed changing condition.

Thus the brake shoes 71 are expanded outwardly against the plate spring 72 by means of the tapered face 634 of the brake portion 635 provided in the left end of the gear frame 63 whereby the outer peripheral surface of the brake shoes are forcibly pressed against the inner surface of the mounting cylinder 52.

When the pushing force of the actuating means 9 is released by rotating the driving means 9 in the normal direction, the gear shifting mechanism 6 is restored to its original position by the resiliency of the spring 24 and at the same time the above-mentioned braking condition is released. Then, even if the gear shifting mechanism 6 has been restored in the above-mentioned manner, there is brought no change on the speed changing condition wherein it had been before it was induced into said braking condition. Consequently, the gear shifting mechanism 6, while rotating in the normal direction, can drive the hub shell 5 in this speed changing condition.

Incidentally, the spring 24 interposed between the brake cone 73 and the gear frame 63 is preferably arranged in the manner of contacting indirectly with the gear frame through the contacting plate 65 screwed thereto so as not to immediately contact therewith, or otherwise a pair of contacting plates are employed to mount a ball therebetween thereby to be mutually moveable and preventing the rotation of the gear frame 63 from being transmitted to the spring 24.

In the above explanation of the embodiment of the present invention, the cam mechanism has been described as comprising the cam 42 including the driving power transmitting face 42a, the inclined face 42b and the cam 91 including the driving power transmitted face 91b, the inclined face 91b, respectively. However, this is replaceable with that cam mechanism, as is shown in FIG. 6, which is constructed in such a manner that the foremost end of the driving means 4 disposed in the hub shell 5 is tapped to form a female screw 421 while the end of the actuating means 9 opposed to said driving means 4 is tapped to form a male screw 911 facing said female screw 421 so that, when the driving means 4 is rotated in the normal direction, these male screw 421 and female screw 911 are screwed to each other thereby to transmit the normal rotation of the driving means to the actuating means 9.

But when the driving means 4 is rotated reversely, said screws are helically advance to move the actuating means 9 in the axial direction.

As has been fully accounted for in the embodiment of the present invention, a bicycle hub provided with a coaster brake and a multi-speed transmission mechanism can drive the hub shell to change the exisiting speed selectively into any desired speed rate, low, intermediate or high, when the driving means 4 is rotated in the normal direction, whereas when it is rotated reversely, said cam mechanism works to move the gear shifting mechanism in the axial direction thereby to operate the brake shoes to take braking effect.

As has been understood from the explanation heretofor made, the gear shifting mechanism of the present invention has a conspicuous feature in that it is constitutionally arranged to be moveable in the axial direction only without being rotated by the driving power of the driving means so that it is quite possible to operate the brake without said driving power.

Accordingly the brake of the present invention is operable by moving the gear shifting mechanism to either side thereof and not by rotating the same. Even if the components constituting the gear shifting mechanism, and especially the engageable portions thereof are damaged to bring the whole system into disorder, the brake of the invention can always work in the reliable manner. It is therefore to be noted that, aside of the cam mechanism described herein with reference to the accompanying drawings, the cam mechanism of this invention is such a type that comprizes a threaded means formed in the inner face of the cam and screwed to the driving means.

It is further to be noted that the present invention is not to be restricted to the construction disclosed herein since many modifications and changes thereof may be made without departing from the spirit and scope of the appended claims.

The embodiments of the invention in which an exclusive property or privilege is claimed are defined as follows:

1. A wheel hub for a bicycle or the like provided with a coaster and a multi-speed transmission gear system, comprising:
   a. a hub shell having a fixed center shaft and defining a space about said center shaft, said shell being rotatably mounted relative to said shaft, and a first, a second, and a third bearing being provided in said space of the hub shell,
   b. a driving means mounted on said first bearing of said hub shell to be rotatable relative to said hub shell, and engaging said third bearing to be rotatable relative to said fixed shaft, the outer periphery of said driving means being provided with a sprocket wheel for receiving the driving power to be transmitted,
   c. a brake cone mounted on said second bearing of said hub shell and secured to said fixed shaft,
   d. an axially moveable multi-speed transmission gear system mounted between the driving means and the brake cone in the space of the hub shell,
   e. an actuating means mounted between said gear system and said driving means in the manner that it can transmit to said system the driving power of the driving means that rotates in the normal direction, whereas it pushes the system to move in the axial direction when the driving means rotates reversely,
   f. a means mounted between said actuating means and said driving means in the manner that it is rotated along with the normal rotation of the driving means so as to transmit the driving power thereof to the actuating means but it works the actuating means to move in the axial direction only when the driving means rotates reversely,
   g. brake shoes mounted between the brake cone and the end of said gear system facing the same in the manner that they are forced to contact with the inner wall of the hub shell along with said axial movement of the gear shifting mechanism, and
   h. a restoring resilient means for pressing the gear system against the actuating means thereby to release the pressed contact of said brake shoes.

2. A wheel hub for a bicycle or the like provided with a coaster brake and a multi-speed transmission gear system, comprising:
   a. a hub shell having a fixed center shaft and defining a space about said center shaft, said shell being rotatably mounted relative to said shaft, and a first, a second, and a third ball bearing race being provided in said space of the hub shell,
   b. a driving means mounted on said first ball bearing race of said hub shell to be rotatable relative to said hub shell, and engaging said third ball bearing race to be rotatable relative to said fixed shaft, the outer periphery of said driving means being provided with a sprocket wheel for receiving the driving power to be transmitted,
   c. a brake cone mounted on said second ball bearing race of said hub shell and secured to said fixed shaft,
   d. a sun gear mounted almost in the midway of the center shaft disposed in the space of the hub shell,
   e. a gear frame mounted midway between the driving means and the brake cone in the space of the hub shell and provided with a plurality of planetary gears and power transmitting pawls, said planetary gears engageable with said sun gear, and a ring gear provided with the pawls and the inside teeth engageable with said planetary gears, the gear frame and ring gear being arranged to move in the axial direction,
   f. actuating means mounted between said ring gear and said driving means in the manner it can transmit to said ring gear or said gear frame the driving power of the driving means that rotates in the normal direction whereas it pushes the ring gear to move in the axial direction when the driving means rotates in the reverse direction,
   g. a means mounted between said actuating means and said driving means in the manner that it is rotated along with the normal rotation of the driving means so as to transmit the driving power thereof to the actuating means but it works the actuating means to move only in the axial direction when the driving means rotates in the reverse direction.
   h. brake shoes mounted between the brake cone and the end of the gear frame facing the same in the manner that they are forced to contact with the inner wall of the hub shell along with said axial movement of the gear frame, and
   i. a restoring resilient means for pressing the gear frame and the ring gear against the actuating means thereby to release the pressed contact of said brake shoes.

3. A wheel hub as defined in claim 1 wherein the foremost end of the driving means disposed in the hub shell is provided with a face for transmitting the driving power to the actuating means and an inclined face for not transmitting this power to the actuating means when the driving means rotates in the normal direction; said actuating means facing the driving means being provided in its one end with a driving power receiving face and an inclined face which respectively have the same shapes as, and are engageable with the driving power transmitting face and the inclined face of the driving means so that, when this means rotates reversely, said inclined face thereof can slidably move along said inclined face of the actuating means thereby to move the latter in the axial direction.

4. A wheel hub as defined in claim 1 wherein the foremost end of the driving means disposed in the hub shell is provided with a male screw while the foremost end of the actuating means facing said driving means is provided with a female screw corresponding to said male screw so that, when the driving means rotates in the normal direction, said male screw and said female screw are engaged with each other thereby to transmit the driving power of the driving means to the actuating means, whereas when the driving means rotates reversely, said two screws are helically moved thereby to move the actuating means in the axial direction.

5. A gear shifting mechanism mounted in the space of the hub shell of said wheel hub as defined in claim 1, comprising a sun gear mounted in the outer periphery of the shaft, a plurality of planetary gears engageable with said sun gear, a gear frame for holding said planetary gears moveably in the axial direction, first pawls mounted in said gear frame and engageable with a ratchet mounted in the inner wall of the hub shell, a ring gear provided with inside teeth engageable with said planetary gears, arranged to be engaged with said gear frame in the axial direction and disposed in contact with one end of the actuating means so that it can move along with the movement of the actuating means, second pawls engageable with another ratchet mounted in the inner wall of the hub shell, a control means for controlling said second pawls, mounted to be detachable of said gear frame and engageable with the actuating means thereby to move in the axial direction into which the driving power is transmitted from the actuating means, and a push rod having a gear shifting key for moving said control means, wherein when the actuating means has been axially moved by the reverse rotation of the driving means, the ring gear and the gear frame are moved in the axial direction without being rotated along with the driving means.

6. A wheel hub as defined in claim 2 wherein a plate is mounted on one end of said gear frame thereby to hold one end of a spring for pressing said gear frame and said ring gear against the actuating means.

7. A wheel hub as defined in claim 6 wherein said plate is mounted to move with the end of said gear frame.

* * * * *